United States Patent [19]
Beaujard et al.

[11] 4,359,331
[45] Nov. 16, 1982

[54] CONTACTOR-SEPARATOR UNITS

[75] Inventors: Jean Beaujard, Orange; Jean-Claude Menes, Bernin; Jean Ravoire, Saint-Ismier, all of France

[73] Assignee: Commissariat a l'Energie Atomique, France

[21] Appl. No.: 901,082

[22] Filed: Apr. 28, 1978

[30] Foreign Application Priority Data

Apr. 29, 1977 [FR] France .................. 77 13644

[51] Int. Cl.³ .................................. B01D 59/00
[52] U.S. Cl. .................................. 55/342; 55/17; 55/392; 55/446; 210/253; 210/322; 261/21; 261/23 R; 422/256
[58] Field of Search .............. 55/17, 352, 392–398, 55/446, 223–225, 266, 315, 343; 23/306, 307; 210/253, 322, 255; 261/21, 23 R; 422/261–264, 256–260

[56] References Cited

U.S. PATENT DOCUMENTS

| | | | |
|---|---|---|---|
| 676,209 | 6/1901 | Staach | 261/21 |
| 2,072,947 | 3/1937 | Fogler et al. | 261/21 |
| 2,851,396 | 9/1958 | Myers, Jr. | 422/256 |
| 3,097,076 | 7/1963 | Reid | 23/306 |
| 3,417,779 | 12/1968 | Golay | 261/23 R |
| 3,707,357 | 12/1972 | Chiang | 23/306 X |
| 3,989,483 | 11/1976 | Becker et al. | 55/17 |

Primary Examiner—John Adee
Attorney, Agent, or Firm—Ostrolenk, Faber, Gerb & Soffen

[57] ABSTRACT

Contactor-separator units of a sub-assembly in which an isotopic exchange between two immiscible phases takes place are associated in m lines and n columns. One of the phases leaving a contactor-separator unit is directly directed to the adjacent contactor-separator unit in the same line, whereas the other phase leaving the same contactor-separator unit, is directed directly to the adjacent contactor-separator unit in the same column. Each of the m lines and n columns is provided with a single pump. The instantaneous flow rates of each phase are substantially equal at the input and the output of each of the contactor-separator units.

1 Claim, 7 Drawing Figures

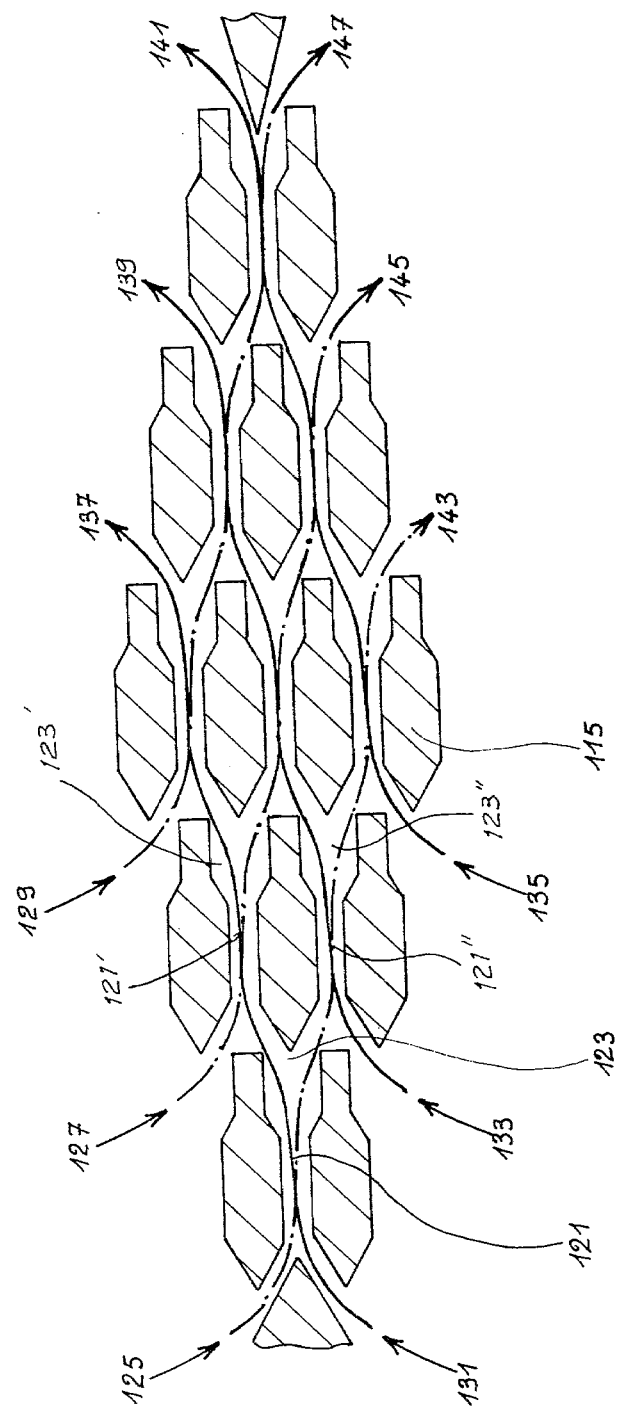

1

CONTACTOR-SEPARATOR UNITS

BACKGROUND AND SUMMARY OF THE INVENTION

The present invention relates to subassemblies of contactor-separator units suitable for use in liquid-liquid or gas-liquid exchange or extraction apparatus.

There exist numerous extraction or exchange processes which require a number of successive operations each successively involving intimate contact between two immiscible fluids and separation between the fluids. Examples of such processes are isotopic enrichment by exchange between two liquid phases containing uranium in different valence states, for instance VI and IV. Another example is separation of rare earths, which may require several hundred of mixing-settling operations for achieving the required purity.

Referring to isotopic enrichment as an example, each elementary contact-separation sequence provides an enrichment, however, with a low partition coefficient, whereby a large number of operations is necessary for achieving the desired enrichment. A large number of contactor-separator units is consequently necessary, in which counter-current flows of two phases occur. In the conventional cascades, one pump for each stage or unit is provided, resulting in high investment and maintainance costs as well as difficult monitoring and control.

The same problem is associated with, for instance, for extraction of deuterium oxide or heavy water, in which ejectors are used drawing gas into a water jet and forming an intimate mixture which is later separated. A plurality of ejectors should be located in series relation to achieve the desired enrichment and each ejector is associated with a separate pump.

It is also known that technology or efficiency reasons limit the flow rate acceptable in a line of contactor-separator units. If a higher flow rate is required, a plurality of lines, each consisting of a plurality of contactor-separator units in series relation, are located in parallel flow relation. But this solution requires the number of pumps to be multiplied by the number of series disposed in parallel.

It is an object of the present invention to remove the need for such a multiplication of the number of pumps in an installation having several series located in parallel, while retaining the advantages of such an arrangement.

According to an aspect of the invention, there is provided a sub-assembly for an exchange or extraction apparatus between a first and a second mutually immiscible fluid phases, typically under such conditions that the net mass transfer between the two phases is small as compared with the instantaneous rates of flow of the phases, comprising: $m \times n$ contactor-separator units located in a matrix arrangement of m lines and n columns, means for directing flows of the first phase to the first contactor-separator units of respective ones of said lines and directing the flow of said first phase from the outlet of each said contactor-separator unit to the inlet of the next contactor-separator unit of the same line, means for directing flows of the second phase to the first contactor-separator units of respective ones of said columns and for directing the flow of said second phase from each contactor-separator unit to the next contactor-separator unit of the same column, and $m+n$ pumping units each associated with a corresponding line or column, providing a pressure increase corresponding to the head loss impressed to the flow by all contactor-separator units in a line or a column, respectively.

The contactor-separator units may be of any one of a number of conventional types. For instance, each may be a static mixer followed by a settler. The pumping means may be of any type providing the necessary rate of flow and pressure increase. No difficulty will be involved since the head loss impressed by a mixer-settler is typically of about 50 cm of water head.

The sub-assembly comprises $m \times n$ contactor-separator units in a matrix or "crossed" arrangement. Since a single pump per line and per column ensures the flow for each phase, the total number of pumps is $m+n$.

The partition coefficient will typically be very low, for instance for the separation of uranium isotopes; it is then necessary to have a large number of contactor-separator units to achieve the isotopic enrichment which is frequently required. Then, an installation will generally be used which comprises a plurality of sub-assemblies each having $m \times n$ contactor-separator units.

The number of lines and columns of the assembly may be equal or different, leading to a "square matrix" or "rectangular matrix" structure.

One or more contactor-separator sub-assembly(ies) according to the invention can also be used in the chemical or petrochemical industry, the re-processing of spent nuclear fuels as well as for isotopic enrichment of uranium.

SHORT DESCRIPTION OF THE DRAWINGS

Several embodiments of the invention will now be described with reference to the accompanying drawings in which only those elements necessary for an understanding of the invention have been shown.

FIGS. 1 and 2 are most simplified block diagrams of a sub-assembly of contactor-separator units for an isotopic enrichment installation, FIGS. 1 and 2 respectively providing indications on the pressures and enrichments;

FIGS. 3, 4 and 5 are simplified block diagrams of an installation having two sub-assemblies of the general type shown in FIGS. 1 and 2, a head end sub-assembly and a tail end sub-assembly, FIGS. 3, 4 and 5 respectively providing indications on the organic phase enrichment, aqueous phase depletion and distribution of pressures;

FIG. 7 is a simplified elevational view of an arrangement of contactor-separator units.

DETAILED DESCRIPTION OF EMBODIMENTS OF THE INVENTION

Figure 1:
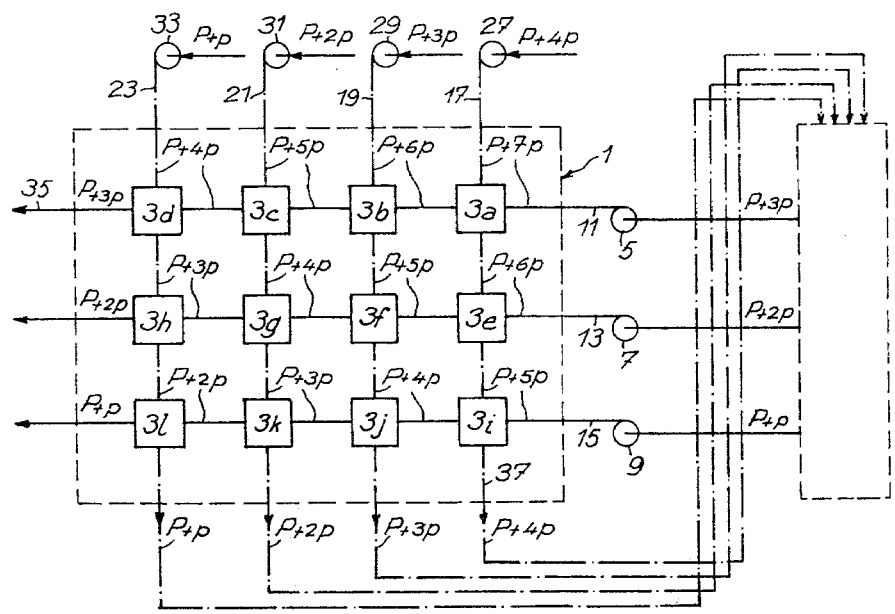

Referring to the drawings, it will be assumed that the installation is for isotopic exchange between an organic phase which becomes enriched in a particular isotope and an aqueous phase immiscible with the organic phase and which becomes progressively depleted in that isotope. The flows of organic and aqueous phases are shown in full line and dash-dot lines, respectively.

Referring to FIG. 1, there is shown a sub-assembly 1 comprising twelve contactor-separator units numbered from 3a to 3l. In each contactor-separator unit, there takes place an elementary operation, namely successive mixing and separation of the two phases. The contactor-separator units may be of any conventional type, for instance mixer-settlers.

The sub-assembly of FIG. 1 is connected with other sub-assemblies located upstream and/or downstream in the direction of flow of the organic phase, for constituting an enrichment installation, by pipe means which will be referred to later.

Referring again to FIG. 1, the twelve contactor-separator units are located at the nodes of a matrix arrangement of three lines and four columns and may be considered as distributed in a rectangular matrix of $m=3$ lines and $n=4$ columns. The sub-assembly includes $m+n=7$ pumps, each associated with a line (pumps 5, 7 and 9) or with a column (pumps 27, 29, 31, 33). Each pump is adapted to balance the head loss impressed to the flow by the contactor-separator units in the corresponding line or column when the required rate of flow circulates along the line or column.

It will be assumed that each contactor-separator unit impresses a pressure loss p to the aqueous and organic flow through it. Since there are $m=4$ contactor-separator units in each line, each of the pumps 5, 7 and 9 must increase by 4p the pressure of the organic phase coming from the preceding subassembly via separate pipes 11, 13 and 15. In each contactor-separator unit, the aqueous phase flows in counter-current with the organic phase and is subjected to approximately the same pressure loss p. Pumps 27, 29, 31 and 33 located on pipes 17, 19, 21 and 23, through which the aqueous phase comes from the following sub-assembly must increase the pressure by $n.p=3p$, since each column includes $n=3$ contactor-separator units.

The flow of the organic phase in the line fed by pipe 11 and pump 5 and that of the aqueous phase in the column fed through pipe 17 and pump 27, in a subassembly in steady state operation, will now be considered.

The pressure of the organic phase coming from the preceding sub-assembly at pressure $P+3p$ is increased by pump 5 to pressure $P+7p$. The organic phase flows in contactor-separator unit 3a in counter-current with an aqueous phase coming from the following sub-assembly through pipe 17. The aqueous phase is also at pressure $P+7p$, owing to pump 27 which brought up its pressure from $P+4p$ to $P+7p$. After exchange, the two phases leave contactor-separator units 3a via separate outlets and are respectively delivered to contactor-separator units 3b and 3e under identical pressures equal to $P+6p$.

In contactor-separator unit 3b, the organic phase again flows in counter-current with an aqueous phase coming through 19 from the following sub-assembly at a pressure which is adjusted at $P+6p$. After separation, the organic and aqueous phases, both at pressure $P+5p$, leave contactor-separator unit 3b and are directed to adjacent contactor-separator units 3c and 3f, respectively.

The organic phase entering contactor-separator unit 3c is contacted with an aqueous phase coming, through pipe 21, from the following sub-assembly and at a pressure increased from $P+2p$ to $P+5p$ by pump 31. The two phases which leave contactor-separator unit 3c by separate outlets are directed to adjacent contactor-separator units 3d and 3g are both at pressure $P+4p$. In contactor-separator unit 3d, the organic phase is successively mixed with and separated from an aqueous phase coming from the following sub-assembly through 23 at a pressure increased to $P+4p$ by pump 33. At the output of 3d, the organic phase is directed towards the following sub-assembly by pipe 35. At the input of that following sub-assembly, a pump (not shown) is provided for raising the pressure in the first line of the sub-assembly by 4 p if the following sub-assembly also comprises four contactor-separator units per line.

The aqueous phase which leaves contactor-separator unit 3a at pressure $P+6p$ is directed to the next contactor-separator unit 3e in the same column where it meets an organic phase coming from the preceding sub-assembly through 13 and at pressure $P+6p$. After exchange, the aqueous and organic phases are separated and respectively directed to contactor-separator units 3i and 3f at a pressure equal to $P+5p$. In contactor 3i, the aqueous and organic phases coming from 3e and from the preceding sub-assembly at pressure $P+5p$ are mixed, separated and sent, at a pressure lowered to $P+4p$, to the preceding sub-assembly for the aqueous phase and to the contactor-separator unit 3j for the organic phase. A pump (not shown) in pipe 37, raises the pressure of the aqueous phase before it enters the preceding sub-unit.

The flows of the organic and aqueous phases in sub-assembly 1 have been described as well as the pressure changes along the line and the column comprising contactor-separator units 3a, 3b, 3c, 3d, 3e, 3i. The other contactor-separator units of the sub-assembly placed in the other lines and columns operate in the same way and the distribution of pressures has been indicated in FIG. 1. It is assumed that the flow rate of the aqueous phase at the input to the contactor-separator units is substantially identical to that of the output of this phase and correlatively the same is true for the organic phase.

Figure 2:
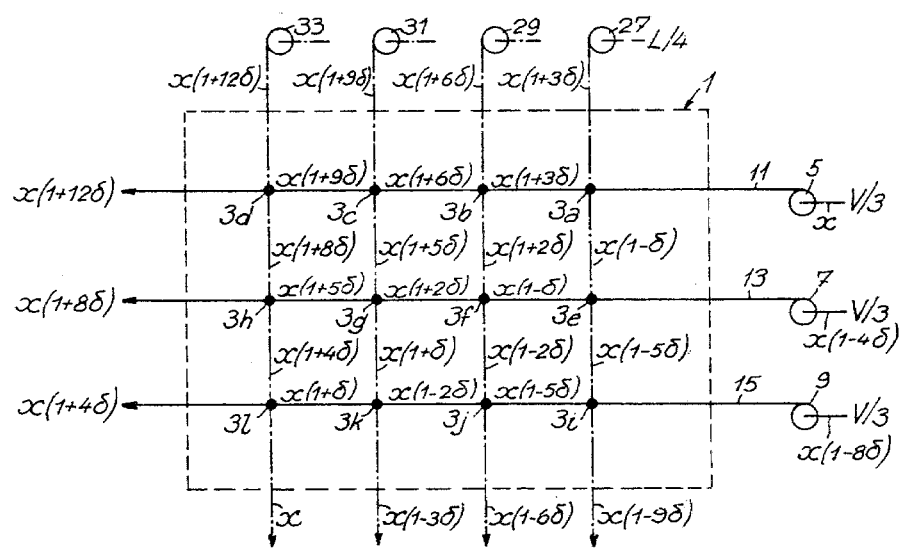

Referring to FIG. 2, there is shown the same sub-assembly as in FIG. 1 with however the contactor-separator units illustrated as dots at the line-column crossings and with indication of the enrichment in a particular isotope (or solute) rather than of the pressures.

By way of example, it will be assumed that the organic phases (which flow along the lines) become enriched in a low-concentration isotope, typically 235 U, at the expense of the aqueous phases (which flow along the columns). The following notations will be used:

x: initial molar fraction of the low concentration isotope (small enough to be substantially equal to the molar ratio)

$\delta$: related to the separation factor $\alpha$ by the relation 4 $\delta=\alpha-1$ Then, the deviation (i.e. the ratio between the molar ratios at the outputs of a unit) will be approximately 4 $\delta.x$ (assuming that x and $\delta$ are much smaller than 1).

Sub-assembly 1, which is one of the numerous similar sub-assemblies of a isotopic separation plant, is represented as comprising twelve contactor-separator units 3. Lines 11, 13 and 15 are each fed with a flow rate V/3 of organic phases coming from the preceding sub-assembly through pumps 5, 7 and 9 respectively. Four pumps 27, 29, 31 and 33 each introduce a flow rate L/4 of aqueous phases originating from the following sub-assembly of the plant, into a respective column 17, 19, 21 or 23. In this example, relative to isotopic separation, the flow rates which are extracted for enriched uranium recovery are small as compared to the internal flow rate and consequently L and V are substantially constant. The organic phase going into contactor-separator unit 3a contains uranium with a isotopic molar fraction (also designated as isotopic abundance) x. In unit 3a, it contacts an aqueous phase coming from the following sub-assembly through 17 at the isotopic abundance $x(1+3\delta)$. Since the organic phase becomes isotopically enriched, the isotopic abundances in the aqueous and organic phases at the output of 3a will respectively be $x(1-\delta)$ and $x(1+3\delta)$. The enrichment provided by each contactor-separator unit is characterized by a deviation $4 \delta.x$ between the outputs. The isotopic enrichments will evolve in the sub-assembly according to the enrichment chart which is shown in FIG. 2.

Figure 3:
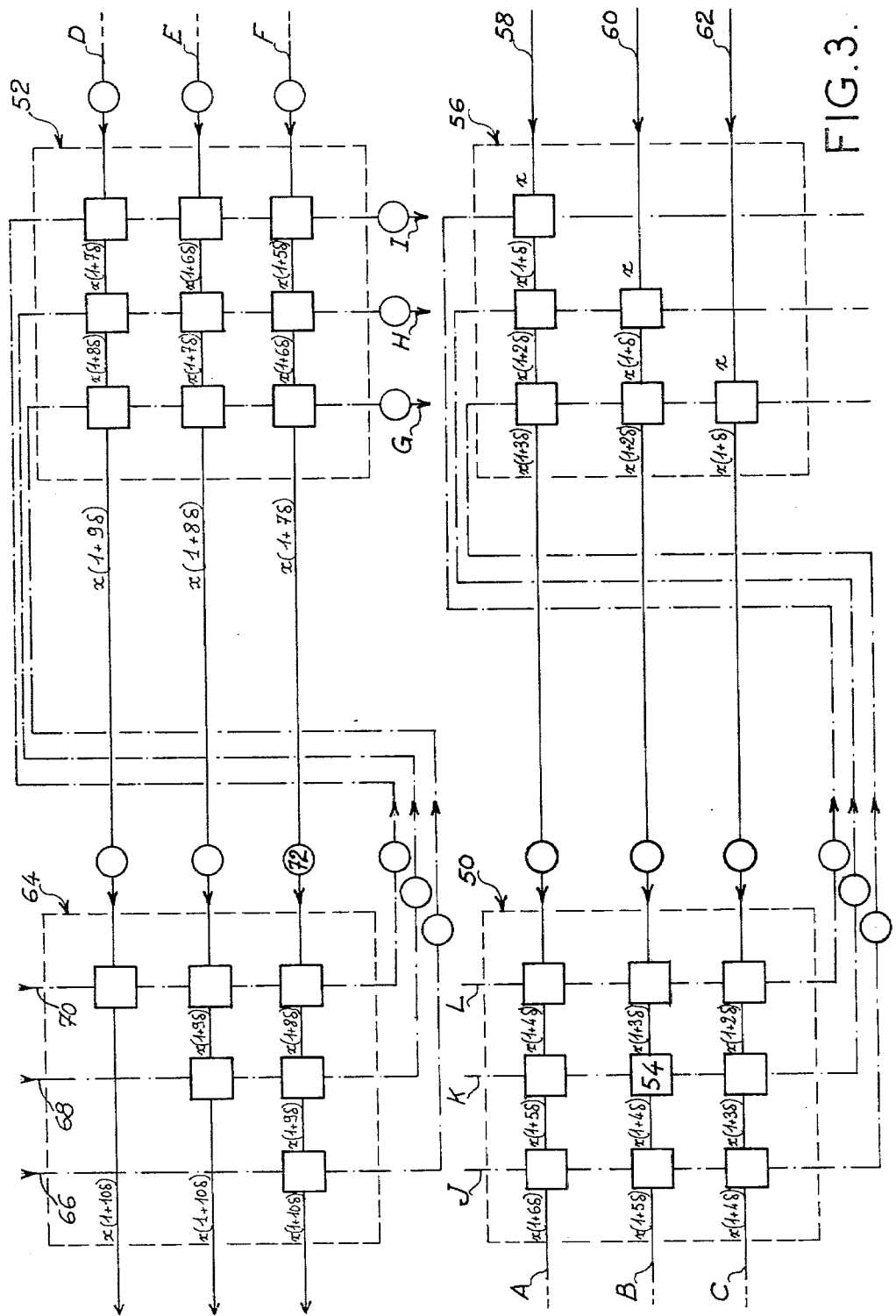
Figure 4:
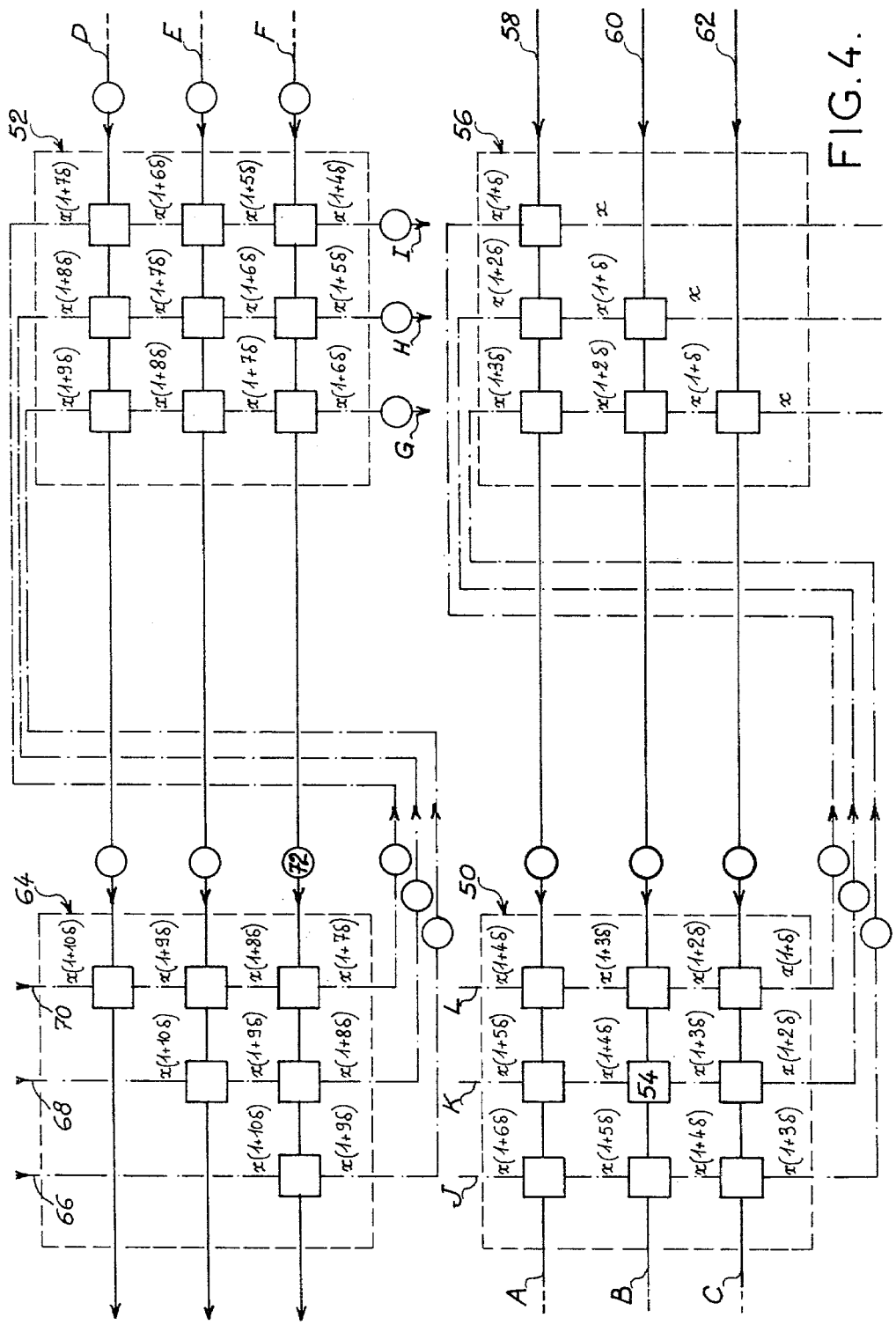
Figure 5:
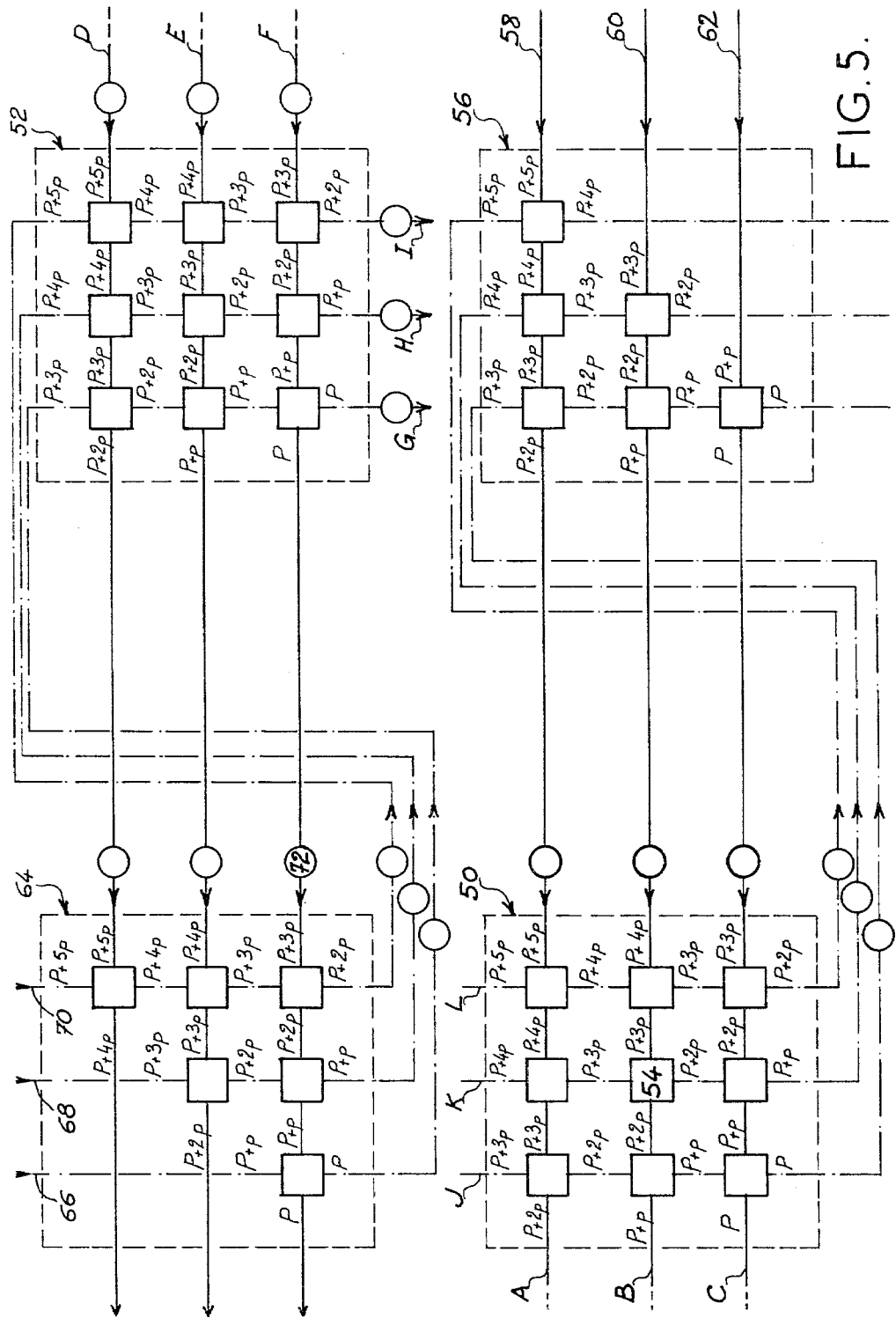

Referring to FIGS. 3, 4 and 5, there is schematically shown an installation for isotopic enrichment of uranium by liquid-liquid chemical exchange, having two sub-assemblies (representative of the much larger number of such sub-assemblies necessary in an actual installation), one input or head sub-assembly and one output or tail sub-assembly, with complete reflow.

Sub-assemblies 50 and 52 are each formed from nine contactor-separator units 54, associated in a "square matrix" structure. The input sub-assembly of the organic phase 56 only comprises six contactor-separator units associated in a triangular arrangement which allows the three lines 58, 60 and 62 to be supplied with organic phases at an identical isotopic abundance, i.e. x (x being the lowest isotopic abundance at the input of the installation) corresponding, for instance, to natural U. The output sub-assembly 64, from which the organic phase flows out, also has six contactor-separator units disposed in a triangular arrangement so that flows of organic phase having the same isotopic abundance $x(1+10\delta)$ are delivered at the output of each line (the enrichment provided by each contactor-separator unit corresponding to a deviation $\delta.x$ between its outputs).

The flows of aqueous phase move in counter-current in relation to the flows of organic phases, in columns 66, 68 and 70 of sub-assembly 64 and then in the columns of the other sub-assemblies up to sub-assembly 56 inclusive. The aqueous phases have an isotopic abundance equal to $x(1+10)$ in each column at their inputs into the installation. At the outputs, the isotopic abundances have dropped to x.

The four sub-assemblies are associated in series; ends A, B, C of lines 58, 60 and 62, at the output of sub-assembly 50, are connected to ends D, E, F of the same lines 58, 60 and 62 of sub-assembly 52. Likewise, the outputs G, H, I of columns 66, 68, 70 leaving sub-assembly 52, are connected to the ends J, K, L of the same columns 66, 68, 70 of sub-assembly 50. The flow of the two phases and the compensation for pressure losses are achieved by pumps, 72 for example, placed in lines and columns in accordance with the invention.

The distribution of the pressures and the isotopic exchanges take place, in this "square matrix" arrangement, in a manner similar to that of the "rectangular matrix" structure described with reference to FIGS. 1 and 2.

For clarity, there has been shown in FIG. 3 the chart of the organic phase enrichments, in FIG. 4 the aqueous phase depletions, and in FIG. 5 the distribution of the pressures in the installation.

Figure 6:
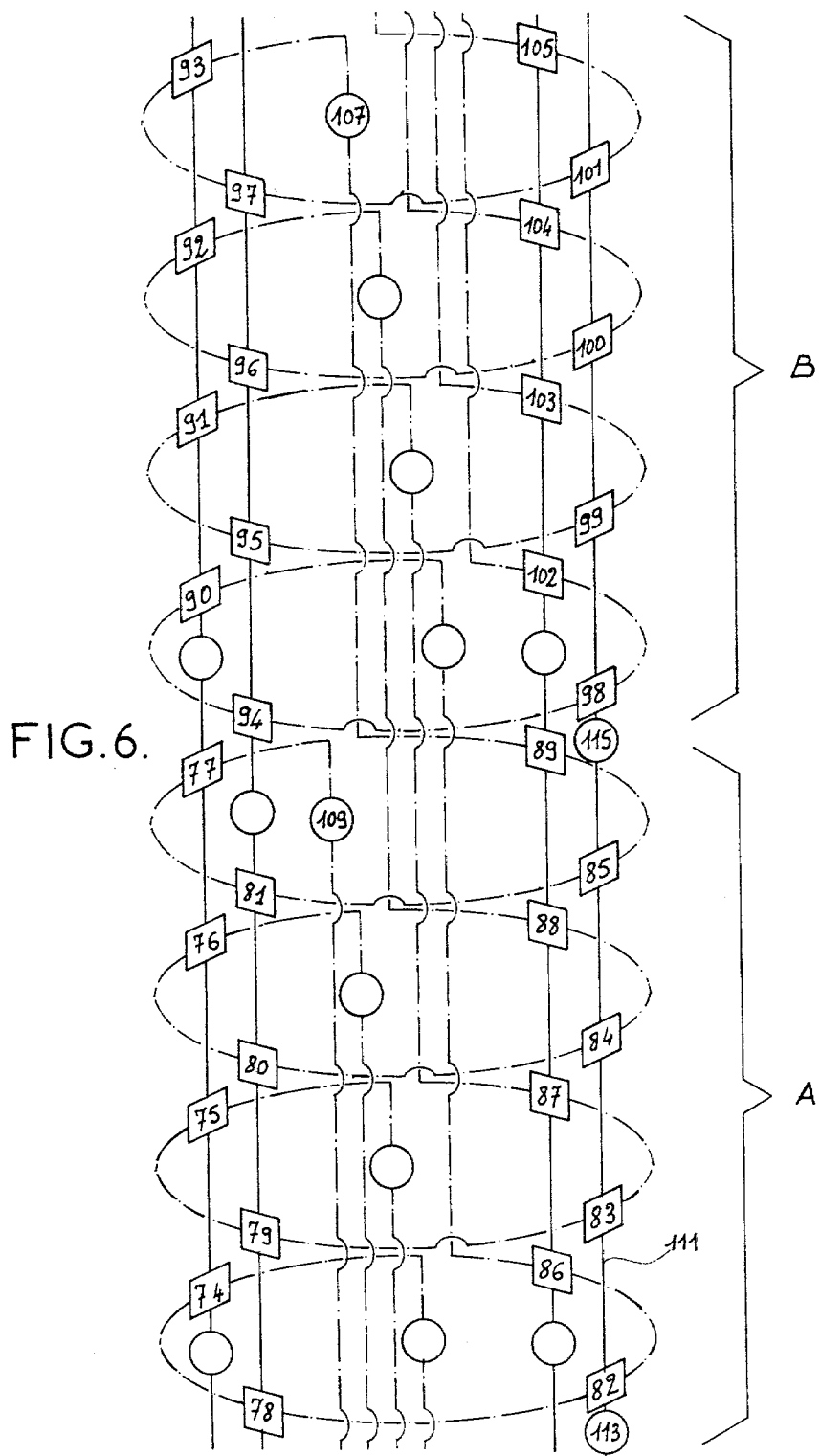
FIG. 6 is a sketch illustrating a possible spatial arrangement of the contactor-separator units of a sub-assembly.

In FIG. 6, two vertically superposed sub-assemblies A and B of the installation have been illustrated. Each of the sub-assemblies, shown in perspective, comprises sixteen contactor-separator units, disposed in four lines and four columns (74 to 89 for sub-assembly A and 90 to 105 for sub-assembly B). With this arrangement, the contactor-separator units are distributed over a cylindrical surface. They could as well be placed along any vertical prismatic surface having, for instance, a triangular, square or hexagonal base.

This arrangement is compact, spares room and appreciably reduces the length of the lines connecting the different components.

The flow of the phases and the operation of the two sub-assemblies shown in this figure are as follows.

The aqueous phases, shown in chain-dotted line, "flow down" from sub-assembly B towards sub-assembly A.

Thus, an aqueous phase, coming from an upper sub-assembly (not shown) enters the first line of sub-assembly B through contactor-separator unit 105. After having gone through the line and been subjected to exchange with organic phases, in the four contactor-separator units 105, 101, 97 and 93, it makes its way, after passing through pump 107, to contactor-separator unit 89 (the first contactor-separator unit of the four units 89, 85, 81 and 77 forming the first line of sub-assembly A). After flowing through the first line of sub-assembly A, the aqueous phase leaves contactor-separator unit 77 to go, after passing through pump 109, to a lower sub-assembly (not shown).

Likewise, an aqueous phase, coming from the upper sub-assembly B enters the second line of sub-assembly B through contactor-separator 104, leaves it, after exchange with organic phases in contactor-separator units 104, 100, 96 and 92, and is delivered to contactor-separator unit 88 of the second line of sub-assembly A. After passing through this second line, the aqueous phase is directed towards the lower sub-assembly. The same occurs for all the other lines of the different sub-assemblies forming the installation.

The organic phases (shown with full lines) "go up" into the columns of sub-assemblies A and B. In column 111 for example, an organic phase brought to the required pressure by pump 113, flows, for exchange with aqueous phases, in contactor-separator units 82, 83, 84, 85 of sub-assembly A. Pump 115, placed at the input of sub-assembly B, raises the pressure of the organic phase before it passes into contactor-separator units 98, 99, 100 and 101 of sub-assembly B. The flow of the organic phases in the other columns takes place in an identical manner.

Referring to FIG. 7, there is shown a vertical cross-section of part of a contactor-separator sub-assembly located in a right parallelepipedic casing (not shown) provided with apertures for the ingoing and outgoing phases, inside which a plurality of obstacles, formed by right prismatic blocks having horizontal edges, shown in cross-section, are placed in staggered relation and cooperate to limit passages between the inputs and the outputs of the phases. Each pair of adjacent blocks forms a passage in which there successively occurs mixing and separation of the phases.

The sub-assembly shown in this figure comprises nine contactor-separator units associated in three lines and three columns, in accordance with the invention, the flow of the aqueous phase being shown with chain-dotted lines and that of the organic phases by full lines.

Fourteen prismatic blocks 115 define with the walls of the enclosure the passages for the two phases. These blocks are cut out so that assembled two by two they form one contactor-separator unit; the intake part 121 provides mixing of the phases whereas settling takes place in section 123 of the passage.

The operation of such a sub-assembly is as follows:

Three pumps disposed at the inputs of aqueous phases 125, 127 and 129, and three pumps placed at the inputs of organic phases 131, 133 and 135 deliver the two phases into the sub-assembly. The aqueous phase circulating as indicated at 125 and the organic phase indicated at 131 are mixed in 121, then separated in 123. The organic phase penetrates into the next contactor-separator unit where, at 121', it meets the aqueous phase entering through 127, whereas the aqueous phase flows into 121" where it is mixed with the organic phase arriving through 133. After separation at 123' and 123", the two phases pass into the three adjacent contactor-separator units. The progress of the phases is shown by full lines and chain-dotted lines, respectively. They leave the sub-unit through outlets 137 to 147 to be directed towards another sub-assembly.

For satisfactory operation, the flow should be moderately turbulent and Reynolds numbers in the range from 1,000 to 10,000 are generally acceptable. As an example, each passage may have a thickness of some centimeters in the throttled portion and the corresponding flow velocity may be of about 1 m/sec.

We claim:

1. A sub-assembly for an exchange or extraction apparatus between a first and a second mutually immiscible fluid phases, comprising:

an enclosure formed with intake means and outlet means for a first fluid phase, and with intake means and outlet means for a second fluid phase;

a plurality of substantially identical bodies of right prismatic shape having a cross-sectional area which is variable along a direction transverse to the other generatrices, placed in staggered relation and defining passages from the intake means to the outlet means for each phase, two adjacent bodies disposed side by side forming one of m×n contactor-separator units (m and n being integers greater than 1), distributed in m lines and n columns, means for delivering flows of the first phase to the first contactor-separator units of respective ones of said lines through respective said intake means, means for delivering flows of the second phase to the first contactor-separator units of respective ones of said columns through said intake means for said second phase, said passages being arranged for said flows in the enclosure to be transverse to said generatrices and to be in counter-current in each one of said contactor-separator units, m first pumping units each associated with one of said m lines and providing a pressure increase equal to the head loss impressed to the first phase flow by all contactor-separator units in said one line, and n second pumping units each associated with one of said n columns and providing a pressure increase equal to the head loss impressed to the second phase flow by all contactor-separator units in said one column.

* * * * *